Feb. 26, 1935.  H. W. WEINHART  1,992,267
GLOW DISCHARGE DEVICE
Filed Dec. 31, 1929

INVENTOR
H. W. WEINHART
BY
Walter C. Kiesel
ATTORNEY

Patented Feb. 26, 1935

1,992,267

UNITED STATES PATENT OFFICE 1,992,267

GLOW DISCHARGE DEVICE

Howard W. Weinhart, Elizabeth, N. J., assignor to Bell Telephone Laboratories, Incorporated, New York, N. Y., a corporation of New York Application December 31, 1929, Serial No. 417,608

16 Claims. (Cl. 176—122)

This invention relates to glow discharge devices and more particularly to devices of this type employed in electro-optical systems.

An object of the invention is to utilize the negative glow in electric discharge devices as an intensive photographically brilliant source of light.

In accordance with a broad aspect of the invention, the intensive glow discharge which is utilized as a light source is confined in a long narrow aperture in a metallic electrode or cathode, the discharge being instituted between the cathode and an anode insulatingly enclosed in the end of the cathode opposite the long narrow aperture. Since the glow discharge is concentrated in the constricted aperture of the cathode, the light portion is mainly in the negative region of the discharge and substantially no glow discharge appears in the positive region due to the close spacing of the anode and cathode. In this arrangement the intensive negative glow discharge provides a column of light which may be directed toward the end of an enclosing vessel containing a gaseous atmosphere.

In a specific embodiment of the invention an enclosing vessel contains a filling of inert monatomic gas, such as helium, argon or neon at low pressure or a mixture of a monatomic gas and a small quantity of an easily ionizable diatomic gas, such as nitrogen, hydrogen or oxygen. The vessel is provided with a stem through which the leading-in wires for the electrodes are sealed and which also serves as supports for the electrodes. The electrode structure comprises a metallic cathode having a cylindrical portion and a cup portion, the cylindrical portion having an elongated capillary opening extending to the cup-shaped portion. A metallic disc electrode which serves as the anode is positioned within the cup-shaped portion of the cathode and insulatingly enclosed and supported therein, The compact electrode structure may also be supported from the stem by arms extending to a collar surrounding the stem.

In another embodiment of the invention the cathode is in the form of a metallic tubular member of small cross-section which is surrounded by a block of insulating material having a countersunk portion in which the metallic anode is supported in operative relation to the constricted aperture in the tubular cathode. This arrangement prevents sputtering of the cathode and provides a high insulation path between the electrodes.

The constricted metallic capillary feature may also be utilized in a modified arrangement in which angular plates are fastened together in the form of a cross or other configuration and at their converging points form an elongated opening of small cross-section. These plates may be supported on an insulating member having a recessed portion in which the anode is located. This construction utilizes the large surface area of the cathode for cooling, since the shape of the plates forms vanes for radiating the heat from the cathode.

When relatively high voltages are applied to the respective electrodes of a discharge device, it becomes necessary to dissipate the heat generated in the cathode at a greater rate than is possible with ordinary radiation methods. In accordance with this invention the capillary type of cathode extends through a metallic thimble which is sealed to a glass portion of the vessel so that a cooling fluid may be circulated in the thimble and the heat dissipated from the cathode surface.

In another form the thimble itself may be the cathode and an anode is insulatingly supported in relation to the capillary opening in the cathode.

These and other features of the invention will be more readily understood from the following detailed description reference being had to the accompanying drawing in which.

Figure 1:
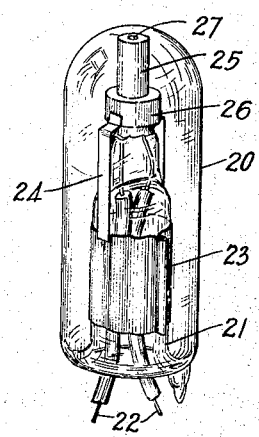
Fig. 1 is a perspective view of an electric discharge device made in accordance with this invention showing the form of the elements and the support thereof in relation to the enclosing vessel.
Figure 2:
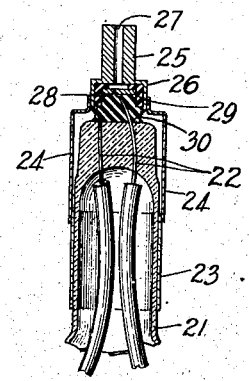
Fig. 2 is a cross-sectional view of the electrode structure shown in Fig. 1 with the glass vessel removed to illustrate the detail structure of the elements and their relative positions with respect to each other.

Referring to the drawing, the electric discharge device of this invention in one embodiment as shown in Fig. 1, comprises an enclosing vessel 20 having a reentrant stem 21 through which leading-in wires 22 for the electrodes are sealed and which is frictionally engaged by a crimped metallic collar 23. A metallic cathode, preferably of nickel, is supported from the collar 23 by parallel metallic strips 24 extending from the collar and welded to the cathode and consists of a cylindrical portion 25 and a hollow or cup-shaped portion 26, the cylindrical portion having an elongated capillary opening 27 which may be circular as shown in Fig. 1, or of any other suitable shape. An anode 28, which may be a flat metallic disc as shown in Fig. 2, is positioned within the cup-shaped portion 26 concentric with the opening 27 and spaced from the walls of the cup-shaped portion of the cathode by an insulating member or sleeve 29. The anode and insulating sleeve are rigidly maintained in the hollow portion of the cathode by an insulating cement 30, of quartz powder mixed with a binder to form a plastic mass. The cement may also enclose the leading-in wires 22 between the electrodes and the sealed press of stem 21 to prevent arcing. The enclosing vessel 20 contains a filling of an inert monatomic gas, such as helium, argon or neon at low pressure, or a mixture of the monatomic gas and a small quantity of an easily ionizable diatomic gas, such as nitrogen, hydrogen or oxygen. The assembly of the electrodes and the position of the constricted capillary opening in the cathode close to the end of the containing vessel causes an intensive and concentrated glow to be produced in the negative portion of the discharge to function as a source of light of high brilliance. Furthermore, the device may be utilized to direct an intense light on a film or other recording strip used for speech reproduction through a slit directly without the employment of lenses.

Figure 3:
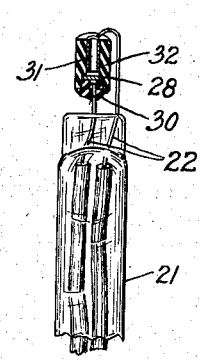
Fig. 3 illustrates a modified form of the device partly in cross-section and the mounting therefor.

By constructing the cathode with a relatively long constricted opening the discharge is confined to the inner surface of the cathode and substantially no discharge appears on the outer surface of the cathode thereby reducing the possibility of arcs and preventing the spreading of the discharge which reduces its brilliance. However, the same effect may be accomplished by shortening the length of the constricted metal cathode and surrounding the outer surface with insulating material, as shown in Fig. 3, in which the cathode comprises a metallic tubular member 31 of small diameter which is embedded in a block of insulating material 32 having a countersunk portion in which the metallic disc anode 28 is supported and rigidly attached by insulating cement 30. The electrode structure is supported from the stem 21 by leading-in wires 22, one of which is attached to the cathode and the other to the anode. This arrangement has the added advantages of preventing sputtering of the cathode and providing a long insulating path between the leading-in wires.

When high potentials are employed to increase the output of the device it becomes necessary to dissipate the heat generated by the cathode. Otherwise the intense glow, being confined to the narrow aperture of this electrode, may cause excessive heating of the electrode and thereby liberate deleterious gases which will shorten the life of the device by contaminating the beneficial gaseous atmosphere in the device.

Figure 4:
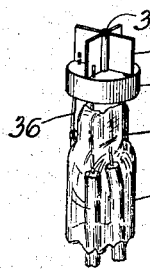
Fig. 4 is a perspective view of another form of electric discharge device made in accordance with this invention in which the cathode is formed to radiate the heat efficiently.
Figure 5:
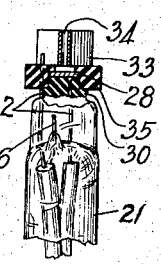
Fig. 5 is a cross-sectional view of the device shown in Fig. 4.

In accordance with this invention as illustrated in Figs. 4 and 5 the cathode is formed of a plurality of angular plates 33 having their flat sides joined together in a symmetrical reticulated configuration and converging at their folded portions in an elongated constricted aperture or capillary opening 34. The plates 33 are mounted on an apertured disc 35 of insulating material and are further supported by wires 36 sealed into the stem 21, extending through the disc 35, and welded to the angular plates 33. An anode 28 is supported and sealed in a recessed portion of the disc 35 by insulating cement which also joins the insulating disc to a press on the stem 21. In this construction the angular plates 33 form heat radiating vanes and materially increase the heat dissipation of the cathode.

In the glow discharge devices heretofore described the intensive light source is projected to the end of an elongated tubular enclosing vessel to conserve space in a compact assembly of apparatus employed in speech recording on films. It is, of course understood, that the light source may be directed toward the side walls of the vessel where the glass is more uniform in thickness. For instance, the perforated cathode structure of Figs. 1 and 2 is shown in this position in Fig. 6. This figure also shows another modification of the invention relating to dissipating the heat generated in the cathode by cooling the portion of the cathode in which the intensive glow discharge takes place with artificial cooling media, such as cool air, water or oil, to carry away the heat from the cathode body. In this embodiment of the invention the cup-shaped perforated cathode having the anode 28 sealed in one end by cement 30 is externally threaded as shown at 39 and extends through a threaded solid end portion 40 of a metallic thimble 41, preferably of copper, which extends parallel to the axis of the enclosing vessel 20 and is provided with an outwardly flared, tapered knife edge 42. The flared edge of the thimble 41 is joined to the tubular glass stem 43 in a manner disclosed in W. G. Housekeeper Patent 1,294,466 dated February 18, 1919, to form a hermetically sealed joint. The metallic thimble 41 forms a cavity in communication with the exterior of the vessel through which cooling fluid, such as water, may be circulated in order to maintain the thimble at a low temperature and since the cathode is directly in contact with the thimble the heat will be conducted away from the cathode. It will be noticed that the cooling fluid will not strike the cathode itself as shown in the construction of the device in Fig. 7. The purpose of this arrangement is to convey the heat from the cathode to the solid portion 40 of the thimble which is cooled by the water or other liquid, and thereby eliminate corrosive effects of the cooling liquid on the cathode surface which would cause deleterious gases and water vapor to contaminate the gaseous atmosphere in the vessel 20 of the cell. Furthermore, it is possible to obtain a good mechanical contact between the thimble and the cathode structure without being concerned about a tight hermetic seal between these members. If desirable the copper thimble may be electroplated with nickel or chromium to improve its appearance and also prevent absorption of the gaseous filling in the vessel.

Figure 6:
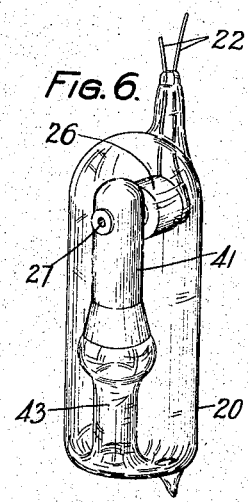
Fig. 6 is a perspective view of another embodiment of this invention in which the cathode is cooled externally and the intensive light is directed to the side of the vessel.
Figure 7:
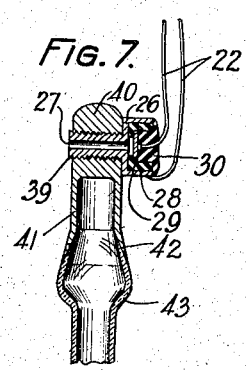
Fig. 7 illustrates in cross-section the details of construction of the electrode assembly shown in Fig. 6.
Figure 8:
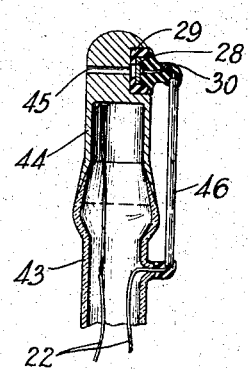
Fig. 8 is a cross-sectional view of a modified form of the structure shown in Fig. 6 in which the cooling element acts as the cathode of the discharge device and the anode is insulatingly supported therein.

A modification of the structure shown in Figs. 6 and 7 is illustrated in Fig. 8 wherein a metallic thimble 44 provided with a capillary opening 45 is sealed to the open ended stem 43 as previously described and functions as the cathode of the device and the leading-in wire 22 is attached to the cathode in the cavity for circulating the cooling fluid. The thimble 44 is further provided with a recessed portion in which the anode 28 is insulatingly supported by a perforated insulating cup or member 29 and sealed in operative relation to the opening in the cathode by cement 30. The leading-in wire 22 for the anode 28 is sealed into the stem 43 and extends through an insulating tube 46, and passes through the sealing cement to the anode.

Figure 9:
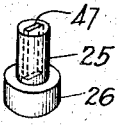
Fig. 9 is a perspective view of an electrode similar to Fig. 1 having a rectangular slit therethrough.
Figure 10:
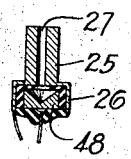
Fig. 10 shows in cross-section a modified arrangement in which the anode is provided with a conical recess.

Figs. 9 and 10 show various modifications of the cathode and anode respectively. In Fig. 9 the metallic cathode formed of the cylindrical portion 25 and cup-shaped portion 26 is provided with a rectangular slit 47 extending longitudinally of the cylindrical portion 25 so that a device employing this construction may be associated directly with a recording film without the aid of lenses or focusing slit to project the intensive light source on the film. Fig. 10 shows a different shape for the anode 48 in which the surface adjacent the cathode is formed into a conical recess to concentrate the luminous discharge in the axis of the constricted opening 27.

While the invention has been disclosed in a variety of ways to illustrate various features which may be interchangeable in all the devices, it is of course understood that various other structural modifications may be made without departing from the scope of the invention as defined in the appended claims.

What is claimed is:

1. A gaseous glow discharge lamp comprising an enclosing vessel provided with an open-ended stem, a gaseous filling therein, two metallic cold electrodes supported in said vessel, one of said electrodes having an elongated capillary opening, the other electrode being spaced therefrom and closing one end of said opening whereby the discharge occurs between this electrode and the wall of said opening, means directing the unobstructed end of said capillary electrode toward the wall of said vessel and a member for closing the open end of said stem to provide a cooling chamber and for supporting said electrodes.

2. A gaseous glow discharge lamp comprising an enclosing vessel having an open-ended stem, a gaseous filling in said vessel, a pair of metallic electrodes in said vessel, one of said electrodes having an elongated capillary opening, the other electrode insulatingly closing one end of said capillary electrode, and means secured to the open end of said stem for closing it to provide a cooling chamber and for supporting said electrodes.

3. A gaseous glow discharge lamp comprising an enclosing vessel having an open-ended stem, a gaseous filling therein, an elongated metallic electrode having an elongated opening of small cross-sectional dimension supported in said vessel, a metallic disc electrode adjacent one end of said elongated electrode, an insulating spacer between said electrodes, and insulating cement securing said disc electrode in said spacer to provide a cooling chamber which supports said structure.

4. A gaseous glow discharge lamp comprising an enclosing vessel having an open-ended stem, a gaseous filling therein, an outer metallic electrode, and an inner electrode insulatingly enclosed in said outer electrode, said outer electrode having an elongated constricted opening through which said gaseous filling is introduced to said electrode surfaces and a support for said electrodes secured to and closing the open end of said stem to thereby provide a cooling chamber.

5. In a glow discharge lamp provided with an open-ended stem, a metallic electrode having a capillary opening, and another electrode insulatingly supported by said first electrode and a support for said electrodes secured to and closing the open-end of said stem.

6. In a glow discharge lamp having an open-ended stem, a metallic electrode having a capillary opening therein, a perforated insulating member secured to said electrode, and another electrode, mounted in said member in operative relation to said opening and support for said electrodes secured to and closing the open end of said stem.

7. In a glow discharge device having an open-ended stem, an outer electrode having a capillary opening therein, a support therefor secured to the open-end of said stem, and an inner electrode insulatingly supported by said outer electrode in axial alignment with said opening.

8. In a glow discharge device having an open-ended stem, an electrode having a recessed portion communicating with a capillary opening, a support therefor secured to the open end of said stem, and another electrode insulatingly supported in said recessed portion.

9. In a glow discharge device, an electrode consisting of a base portion and an extending portion having a capillary opening therein, an open-ended stem, a support for said electrode secured to the open end of said stem, and another electrode insulatingly supported within the base portion of said first mentioned electrode.

10. In a glow discharge device, an outer electrode having a recessed portion terminating in a capillary opening, an open-ended stem, a support for said electrode secured to the open end of said stem, an insulating ring, in said recessed portion, an electrode in said insulating ring, and means for sealing said ring and electrode in said recessed portion.

11. In a glow discharge device, an electrode structure comprising an electrode having a capillary opening and another electrode insulatingly supported thereby, and an open-ended stem provided with means for closing the open end of said stem and for supporting said electrode structure.

12. A gaseous glow discharge device comprising an enclosing vessel, a gaseous filling therein, a cylindrical cathode having a capillary opening supported in said vessel, an anode insulatingly supported in one end of said cathode, an open-ended stem and means in contact with said cathode surface and secured to the open-end of said stem through which heat generated during operation is dissipated.

13. In a glow discharge device, a metallic electrode having a capillary opening, another electrode insulatingly supported thereby, and an open-ended stem, a cooling vessel secured to the open end of said stem for supporting said electrodes.

14. An electric discharge device comprising a vessel having open ended stem, a metallic thimble closing one end of the stem, an electrode having a capillary opening mounted in said thimble, and another electrode insulatingly supported by said capillary electrode.

15. In a glow discharge device, an electrode structure comprising a cathode having a capillary opening, an open ended stem supporting said cathode and closed thereby, an anode insulatingly supported by said cathode, and means for cooling said cathode.

16. In a glow discharge device an electrode structure comprising a cathode having a capillary opening and an anode insulatingly supported by said cathode, and an open ended stem for supporting said electrode structure and closed thereby and through which a cooling medium may be circulated.

HOWARD W. WEINHART.